United States Patent [19]

Kasuga

[11] Patent Number: 4,962,999
[45] Date of Patent: Oct. 16, 1990

[54] OPTICAL PICK-UP DEVICE

[75] Inventor: Ikuo Kasuga, Nagano, Japan

[73] Assignee: Kabushiki Kaisha Sankyo Seiki Seisakusho, Nagano, Japan

[21] Appl. No.: 245,416

[22] Filed: Sep. 16, 1988

[30] Foreign Application Priority Data

Sep. 16, 1987 [JP] Japan .................................. 65-141437
Sep. 16, 1987 [JP] Japan .................................. 65-141438
Sep. 16, 1987 [JP] Japan .................................. 65-141439

[51] Int. Cl.$^5$ .............................................. G02B 7/02
[52] U.S. Cl. .................................... 350/247; 350/255; 369/44.11
[58] Field of Search ............... 350/247, 255, 254, 257, 350/429; 369/44, 45, 46

[56] References Cited

U.S. PATENT DOCUMENTS

| 3,600,066 | 8/1971 | Del Vecchio et al. | 350/429 |
| 4,495,071 | 1/1985 | Kodama et al. | 369/45 |
| 4,596,444 | 6/1986 | Ushida | 350/247 |
| 4,653,856 | 3/1987 | Kamiko | 350/255 |
| 4,794,580 | 12/1988 | Ikedo et al. | 369/44 |

Primary Examiner—Bruce Y. Arnold
Assistant Examiner—Loha Ben
Attorney, Agent, or Firm—Flynn, Thiel, Boutell & Tanis

[57] ABSTRACT

An optical pick-up device is disclosed, in which a bearing member for moving it along a guiding shaft is disposed separately and independently from a base plate and the bearing member can be mounted selectively on one side surface or the rear surface of the base plate.

19 Claims, 2 Drawing Sheets

OPTICAL PICK-UP DEVICE

FIELD OF THE INVENTION

This invention relates to an optical pick-up device, which can be used in an optical disk device, an opto-magnetic disk device, etc.

BACKGROUND OF THE INVENTION

In a first prior art optical pick-up device, it is necessary to arrange 3-dimensionally optical elements such as a semiconductor laser device, a prism, a collimator lens, etc. with a high precision. Heretofore, in order to position and fix these optical elements with a high precision, a frame is used. Since different optical elements have different forms and postures, with which they are mounted on the frame, it should have a complicated shape. Therefore, heretofore, it is fabricated by a one-body formation such as die casting, resin mold, etc.

Second prior art optical pick-up devices, which are used in an optical disk device, an opto-magnetic device, etc. are classified into those of thin portable type, and those of standard type for home use and each of them is mounted on a frame formed in one body, which is exclusively used either for those of thin type or for those of standard type.

Third prior art optical pick-up devices, which are used in an optical disk device, an opto-magnetic disk device, etc, are fabricated by positioning optical elements such as a semiconductor laser device, a lens, a prism, etc. on a frame having a one-body-structure from one open side and fixing them, the whole side being closed thereafter by a cover.

OBJECT OF THE INVENTION

In a first prior art optical pick-up device, since the frame is fabricated by the one-body formation, distortions are produced in the frame due to non-uniformity in the thickness, local differences in the shape, etc. at the formation, which lowers the precision of the positioning of the optical elements, which is required for the optical pick-up device. Furthermore, since the optical elements are usually fixed to the frame by adhesion, when distortions are produced in the frame, they are produced also in the optical elements, which is apt to give rise to optical aberrations. If the frame has a robust structure in order to prevent the distortions, this will be a neck to be overcome to reduce the size.

The main object of this invention is to provide an optical pick-up device having a structure useful for reducing the thickness and in particular to provide an optical pick-up device having a small size and a high reliability while keeping a high precision by superposing the frame, on which the optical elements are to be mounted, on a base plate made of a cold rolled plate for maintaining the high precision, in order to resolve the problem of the first prior art device.

In a second prior art optical pick-up device, since it is necessary to mount it, which is exclusively used either for an optical pick-up device of thin type or for that of standard type, the quality of the frame should be controlled. Consequently, not only the control is troublesome, but also the cost is increased. Further, since there are restrictions on the size of the frame, the freedom of the design of the mounting is limited.

Another object of this invention is to provide an optical pick-up device widely usable in common so that it can be used both in a thin type optical pick-up device and in a relatively thick standard type device, in order to resolve the problem of the second prior art device.

In a third prior art optical pick-up device, since it is so constructed that the open side, through which the optical elements are positioned and fixed on the frame, is closed by a cover, gaps between the frame and the cover are apt to be produced, through which dust penetrates therein, so that transmission or reflection characteristics of the optical elements are remarkably deteriorated. Further, the strength of the cover is insufficient and it can be no satisfactory protection thereof against distortions and displacements due to external forces. In addition, since the optical elements are almost exposed to the atmosphere, there is a problem that they are easily deteriorated or dew condensation is apt to take place due to change of the circumstances.

A still another object of this invention is to provide an optical pick-up device, in which neither distortions nor displacements of the optical elements due to external forces take place and dust penetrates hardly owing to the fact that they are closely sealed, when they are positioned and fixed on the frame, in order to resolve the problem of the third prior art optical pick-up device.

SUMMARY OF THE INVENTION

This invention for resolving the first problem described above is characterized in that an optical pick-up device comprises a base plate made of a cold rolled plate, a fixed supporting frame made of a prefabricated piece fixed and supported on this base plate, to which piece the optical elements are secured, and a movable supporting frame holding at least an objective lens and supported position-controllably on the base plate.

This invention for resolving the second problem described above is characterized in that an optical pick-up device comprises a base plate disposed substantially parallelly to a recording medium and holding the optical elements and a bearing member for moving this base plate along guiding shafts and that this bearing member can be mounted selectively on one side surface or the rear surface of the base plate.

This invention for resolving the third problem described above is characterized in that an optical pick-up device comprises a fixed supporting frame, whose one side is open, to fix and support the fixed optical elements including at least a semiconductor laser thereon, a beam splitter and a light receiving element, and a base plate covering the open side of the fixed supporting frame and fixed on the open side.

According to the structure of this invention for resolving the first problem of the prior art techniques described above, the optical elements are supported by the fixed supporting frame and the latter is supported by the base plate made of a uniform cold rolled plate having a high strength and a high rigidity with a high precision. In this way, the thickness of the device can be reduced. (If the fixed supporting frame and the base plate were formed in one body by die casting, etc. as by the prior art techniques, the base plate formed in one body by die casting would not be able to maintain the precision, unless it is fairly thick with respect to a base plate made of a cold rolled plate.)

According to the structure of this invention for resolving the second problem of the prior art techniques described above, it is possible to reduce the thickness by mounting the bearing member on one side surface of the base plate. If the bearing member is mounted on the rear surface of the base plate, although the size in the thickness is more or less increased, the extent in the transversal direction is reduced.

According to the structure of this invention for resolving the third problem of the prior art techniques described above, the open side of the fix supporting frame supporting fixedly the optical elements is fixed on the base plate and the open side thereof is covered. Therefore, the interior of the frame is closely sealed and a remarkable dust-tight effect can be obtained. The bearing member may be selectively mounted, in order that the pick-up device can be widely used so that it can be applied also to the standard type disk device.

DETAILED DESCRIPTION

Figure 1:
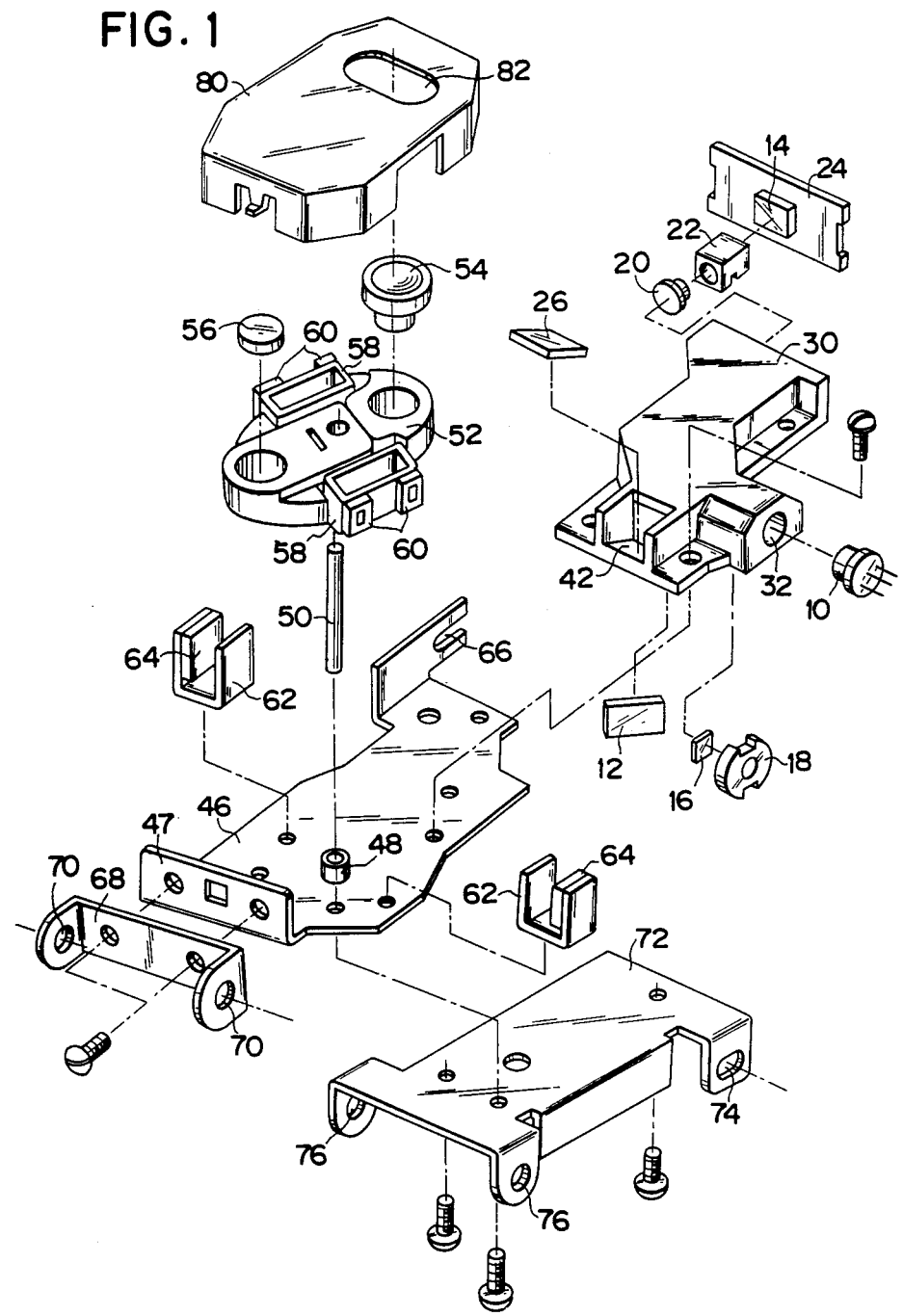
FIG. 1 is an exploded perspective view illustrating an embodiment of an optical pick-up device according to this invention.

Hereinbelow, an embodiment of the optical pick-up device according to this invention will be explained, referring to the drawings.

Figure 2:
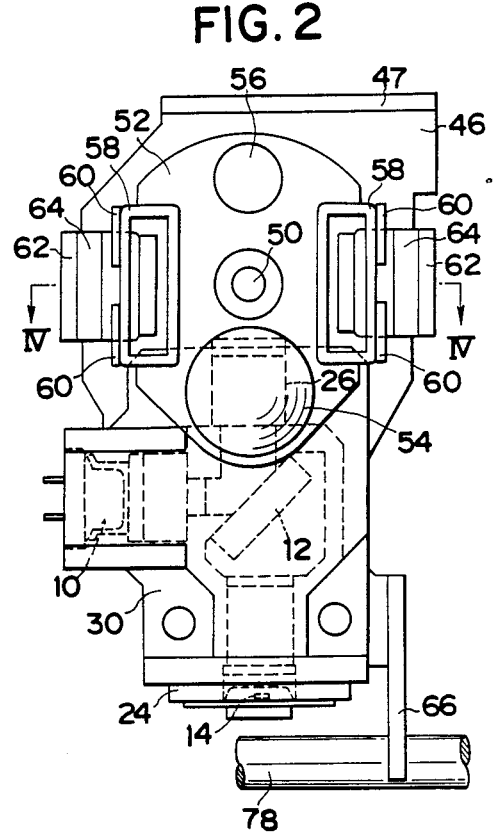
FIG. 2 is a plan view of the same embodiment.
Figure 3:
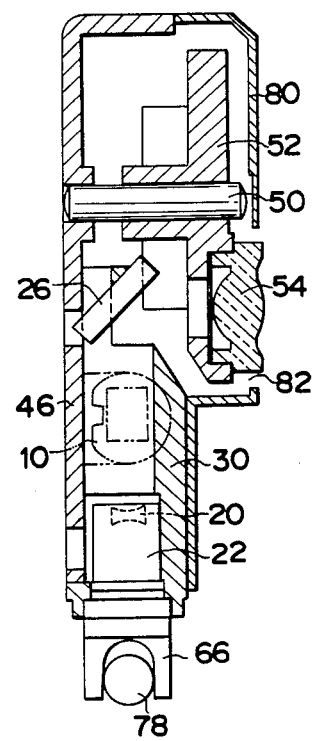
FIG. 3 is a cross-sectional view viewed from the upside.
Figure 4:
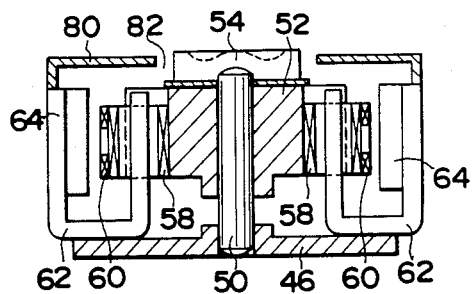
FIG. 4 is a cross-sectional view along the line IV—IV in FIG. 2.
Figure 5:
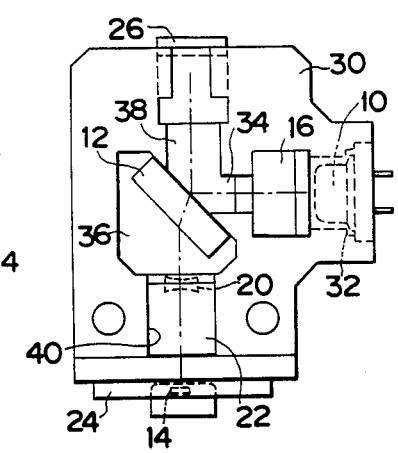
FIG. 5 is a bottom view of the fixed supporting frame used in the same embodiment.

In FIGS. 1 to 5, reference numeral 30 represents a fixed supporting frame, on which optical elements are mounted, and which is fabricated in one body by die casting or resin mold. On the rear side, which is one side of this fixed supporting frame 30, an open surface is made by forming open grooves 34, 38, 40 and an open portion 36 (refer to FIG. 5). The open grooves 34, 38, 40 are connected with each other through the central open portion 36. The open grooves 34 and 38 as well as the open grooves 38 and 40 form an angle of 90° with each other. A hole 32 connected with the open groove 34 is formed from one side of the fixed supporting frame 30 and a semiconductor laser device 10 is inserted in the hole 32 and a diffraction grating 16 held by a holder 18 is inserted in the open groove 34. A beam splitter 12 dividing a laser light beam coming from the semiconductor laser 10 is fixed obliquely in the open portion 36. An oblique surface 42 connected with the open groove 38 is formed at the external end portion of the fixed supporting frame 30 and a mirror 26 leading the laser light beam divided by the beam splitter 12 to an objective lens stated later is secured to this oblique surface 42. A holder 22 holding a sensor lens 20, which is a concave lens, is inserted in the open groove 40. A light receiving element 14 receiving the laser light beam passing through the lens 20 is secured to the external surface of the fixed supporting frame 30 by a holder 24.

In this way, the optical elements including the semiconductor laser device 10, the beam splitter 12, the light receiving element 14, etc. are supported by the supporting frame 30, whose one side is open, fixed from the open side. The supporting frame 30 is positioned on the base plate 46 at its open side and fixed on the base plate 46 by means of screws, the bottom surface of the supporting frame serving as the reference surface for mounting. In this way, the open side of the fixed supporting frame 30 is covered by the base plate 46 and secured thereto so that the interior thereof is closely sealed.

The base plate 46 is made of a uniform cold rolled plate having a high strength and a high rigidity. However, steel, aluminum, brass, etc. may be used therefor. The base plate 46 is arranged so as to be parallel to the optical disk not shown in the figure.

A bearing 48 is secured to the base plate 46 at a side of the mounting portion of the fixed supporting frame 30 and a shaft 50 is inserted in this bearing 48. A movable supporting frame 52 forming an objective lens block is put movably in the direction of the shaft and rotatably at the upper portion of the shaft 50. An objective lens 54 and a balance weight 56 are fitted on the movable supporting frame 52 opposite to each other with respect to the shaft 50. Further a pair of focusing coils 58,58 are fixed opposite to each other with respect to the shaft 50 along the line perpendicularly intersecting the line connecting the lens 54 and the balance weight 56. A pair of tracking coils 60 and 60 are mounted on these coils 58 and 58, respectively. The objective lens 54 is located above the mirror 26.

A pair of horseshoe-shaped cores 62,62 are fixed on the two sides of the base plate 46, respectively. A permanent magnet 64 is secured to one of a pair of poles pieces of each of the pair of cores 62,62. The other of poles pieces of each of the pair of cores 62,62 penetrates into one of the focusing coils 58,58 and at the same time one side of the coil 58 and the coil 60 described above are inserted between the pair of pole pieces of each of the pair of cores 62,62. In this way, it is possible to control the focusing by moving the movable supporting frame 52, which is the objective lens block, in the direction of the optical axis by controlling the current flowing through the coils 58,58 and to effect the tracking control by rotating the movable supporting frame 52 together with the objective lens 54 around the shaft 50 by controlling the current flowing through the coils 60,60. A constituting portion including the block 52, the objective lens 54, the coils 58,60, the permanent magnets 64,64, etc. constitutes an actuator effecting the focusing and the tracking and this actuator portion is enclosed by a cover 80. A window hole 82 for making light coming from the objective lens 54 pass through is formed in the cover 80.

A bearing portion 66 engaging with a guiding shaft 78 is formed in one end portion of the base plate 46. Further, a folded part 47 is formed upward at the other end portion of the base plate 46 for fixing a bearing member 68 by means of screws. The bearing member 68 has bearing portions 70,70 at the two end portions thereof. Another guiding shaft not shown in the figure, which is parallel to the guiding shaft 78 described above, passes through the bearing portions 70,70. The base plate 46 can move, guided by these guiding shafts. In this way, the whole pick-up device moves in the direction traversing recording tracks on a disk not shown in the figure.

The base plate 46 is so constructed that another bearing member 72 can be fixed by means of screws to the bottom side surface thereof. Folded parts are formed at the two end portions of the bearing member 72 and bearing portions 74 and 76 are formed at these folded parts, respectively. A guiding shaft similar to the guiding shaft 78 stated above passes through the bearing portions 74 and 76. The base plate 46 can move, guided by these guiding shafts and in this way the whole pick-up device moves in the direction traversing the recording tracks on the disk.

The two bearing members 68 and 72 are used selectively. In the case where it is required to reduce the thickness e.g. for a portable type optical disk device, the bearing portion 66 and the bearing member 68 are used and the bearing member 68 is mounted on the folded portion 47 formed on one side of the base plate 46. On the other hand, in the case where it is not required to reduce the thickness, but it is required to reduce the extent in the front and rear and the right and left directions, the bearing member 72 is mounted on the rear surface of the base plate 46. When the bearing member 68 is used, since it increases the size only in the horizontal direction of the base plate 46 and it does not increase the size in the direction of the thickness, it is possible to keep the size in the direction of the height of the optical pick-up device, i.e. the size from the bottom surface of the base plate to the surface of the disk, below 15.5 mm.

After the laser light beam emitted by the semiconductor laser device 10 has passed through the diffraction grating 16, it is bent at a right angle by the beam splitter 12 and bent again at a right angle upward by the mirror 26. Then it passes through the objective lens 54 and is focused on a recording track of the disk not shown in the figure. Light reflected by the disk passes through the objective lens 54 and is received by the light receiving element 14 after having passed through the beam splitter 12 and the sensor lens 20. As well known, it is possible to obtain not only information signals recorded on the disk but also the focusing signal and the tracking signal. Therefore, the reflected light can be used not only for reading out the information signals but also for the focusing control and the tracking control.

According to the embodiment described above the bearing sections for moving the optical pick-up device along the guiding shafts are disposed separately and independently from the base plate 46 as bearing members and at the same time the bearing members described above can be mounted selectively on the side and the rear surfaces of the base plate 46. For this reason, although the main part of the optical pick-up device has a common structure, it can be used both for thin type optical pick-up devices such as a portable type device and for standard type optical pick-up devices for home use, etc. and thus it is possible to try to stabilize the quality and to lower the cost. Further, in the case where the position, the structure, etc. of the guiding shafts are different, since it is possible to take a countermeasure by changing only the design of the bearing members, the freedom of the design is increased. In addition, it is also possible to regulate the mounting angle of the optical pick-up device by adjusting the relative positioning of the bearing members and the main part of the optical pick-up device at the mounting of the bearing members.

The mounting means of the frame 30 on the base plate 46 and that of the bearing means 68 and 72 on the base plate 46 are not restricted to screws, but other appropriate means such as calking, soldering, etc. may be used. There are optical elements, for which adjustment is necessary after the mounting thereof on the supporting frame. For such optical elements they may be mounted e.g. through a plate spring.

Furthermore, since the frame of the optical pick-up device is not formed in one body as one frame, but it is divided into the fixed supporting frame 30 holding the optical elements and the base plate 46 made of a cold rolled plate, the frame structure being constructed by superposing the reference surface of the fixed supporting frame 30 on the base plate 46, deformations of the frame after the mounting are prevented by the base plate made of the uniform cold rolled plate having a high strength and a high rigidity and in this way it is possible to obtain stable optical characteristics with small aberrations. In addition, the thickness of the plate constituting the fixed supporting frame 30 can be reduced owing to the use of the base plate 46 made of a cold rolled plate and in this way it is possible to reduce the size and to lower the weight. Furthermore, since the movable supporting frame 52 holding the objective lens 54 is supported also by the base plate 46 made of a cold rolled plate, stable focusing and tracking controls are possible.

There are optical elements, for which adjustment is necessary after the mounting thereof on the supporting frame. For such optical elements they may be mounted e.g. through a plate spring.

Furthermore, since one side of the fixed supporting frame for the optical elements is open, through which the optical elements are mounted in a concentrated manner, and the open side stated above of the fixed supporting frame 30, on which the optical elements are mounted, is secured to the base plate 46 so that the open side is covered by the base plate 46, the open part of the fixed supporting frame is reduced so that it is closely sealed and it is possible to prevent the penetration of dust to the optical element side. Further, since all the sides are constructed by a robust structure by using the fixed supporting frame 30 and the base plate 46, it is possible to reduce deformations, stress, etc. due to external forces. In addition, owing to the improvement of the air tight property, deteriorations of the optical elements due to change of the circumstances or dew condensations due to variations in the temperature take place hardly and influences of stray light from the exterior are small so that production of noises, etc. is reduced.

In the embodiment indicated in the drawings, although the part of the fixed supporting frame 30, where the mirror 26 is mounted, is open, the other optical elements are enclosed by the supporting frame 30 and the base plate and thus the effects described above can be obtained.

According to this invention, since the bearing sections for moving the optical pick-up device along the guiding shafts are disposed separately and independently from the base plate as bearing members and at the same time the bearing members can be mounted selectively on the side and the rear surfaces of the base plate, although the main part of the optical pick-up device has a common structure, it can be used both for thin type optical pick-up devices such as a portable type device and for standard type optical pick-up devices for home use, etc. and thus it is possible to try to stabilize the quality and to lower the cost. Further, in the case where the position, the structure, etc. of the guiding shafts are different, since it is possible to take a countermeasure by changing only the design of the bearing members, the freedom of the design is increased.

Further, according to this invention, since the frame of the optical pick-up device is not formed in one body as one frame, but it is divided into the fixed supporting frame holding the optical elements and the base plate made of a cold rolled plate, the frame structure being constructed by superposing the fixed supporting frame on the base plate, deformations of the frame after the mounting are prevented by the base plate made of the uniform cold rolled plate having a high strength and a high rigidity and in this way it is possible to obtain stable optical characteristics with small aberrations. In addition, the thickness of the plate constituting the fixed supporting frame can be reduced owing to the use of the base plate made of a cold rolled plate and in this way it is possible to reduce the size and to lower the weight.

Furthermore, since one side of the fixed supporting frame for the optical elements is open, through which the optical elements are mounted in a concentrated manner, and the open side stated above of the fixed supporting frame, on which the optical elements are mounted, is secured to the base plate so that the open side is covered by the base plate, the open part of the fixed supporting frame is reduced so that it is closely sealed and it is possible to prevent the penetration of dust to the optical element side. Further, since all the sides are constructed by a robust structure by using the fixed supporting frame and the base plate, it is possible to reduce deformations, stress, etc. due to external forces. In addition, influences of stray light from the exterior are small so that production of noises, etc. is reduced.

WHAT IS CLAIMED IS:

1. An optical pick-up device comprising:
   a base plate made of a cold rolled plate;
   a fixed supporting frame made of a prefabricated piece supported by said base plate, secured thereto, to which optical elements including a semiconductor laser device, a beam splitter, a light receiving element, etc. are fixed; and
   a movable supporting frame holding at least an objective lens and supported by said base plate so that the position can be controlled.

2. An optical pick-up device according to claim 1, wherein one side of said fixed supporting frame is open and said fixed supporting frame is constructed so as to support said optical elements including at least the semiconductor laser device, the beam splitter, the light receiving element, etc., said base plate covering the open side of said fixed supporting frame and being secured thereto on the open side.

3. An optical pick-up device according to claim 1, wherein said fixed supporting frame is fabricated in one body by die casting or resin mold.

4. An optical pick-up device comprising:
   a base plate oriented approximately parallel to a recording medium and means supporting on said base plate optical elements such as a semiconductor laser device, a beam splitter, a light receiving element, total reflecting mirror leading light to said recording medium, etc., said base plate having first means for facilitating attachment of a bearing member to said base plate at a first location thereon, and having second means for facilitating attachment of a bearing member to said base plate at a second location thereon spaced from said first location;
   a first guiding shaft extending approximately parallel to said base plate; and
   a bearing member supported for sliding movement along said first guiding shaft, said bearing member being attached to said base plate at one of said first and second locations thereon.

5. An optical pick-up device according to claim 4, further comprising a second guiding shaft extending parallel to said first guiding shaft, wherein said base plate has a bearing portion at one end portion of said base plate which is slidably supported on said second guiding shaft, wherein said first means includes means defining a side surface on said base plate at said first location spaced from said bearing portion, and wherein said bearing member is mounted on said side surface of said base plate.

6. An optical pick-up device according to claim 4, further comprising a second guiding shaft extending parallel to said first guiding shaft, wherein said bearing member has bearing portions formed in folded portions provided at each of two end portions thereof, said guiding shafts respectively slidably supporting said bearing portions located at respective said end portions of said bearing member, wherein said second means includes means defining a rear surface at said second location on said base plate, and wherein said bearing member is mounted on said rear surface.

7. An optical pick-up device, comprising: a base member having a first fastening structure at a first location thereon and a second fastening structure at a second location thereon spaced from said first location; means supporting a plurality of optical elements on a supporting member fixedly secured to said base member; a bearing member disposed at one of said first and second locations and having means for facilitating a movable support of said bearing member; and fastening means for fastening said bearing member to said base member at said one of said locations, said fastening means including one of said first fastening structure and said second fastening structure.

8. An optical pick-up device, comprising: a base member having a first fastening structure at a first location thereon and a second fastening structure at a second location thereon spaced from said first location; means supporting an optical element on said base member; a bearing member disposed at one of said first and second locations and having means for facilitating a movable support of said bearing member; and fastening means for fastening said bearing member to said base member at said one of said locations, said fastening means including one of said first fastening structure and said second fastening structure; wherein said base member is a plate.

9. A device as recited in claim 8, wherein said base member includes a main portion extending in a first direction, and a side portion provided at an end of said main portion and bent to extend in a second direction approximately perpendicular to said first direction, said second fastening structure being provided on said side portion and said first fastening structure being provided on said main portion at a location spaced from said side portion.

10. A device as recited in claim 9, wherein said first fastening structure on said main portion of said plate includes an opening through said main portion of said plate, and wherein said second fastening structure on said side portion of said plate includes an opening through said side portion of said plate.

11. A device as recited in claim 9, wherein said side portion of said plate has a surface thereon extending parallel to said second direction, and wherein said bearing member has a first portion which is disposed against said surface on said side portion of said plate and has at each end of said first portion a second portion which extends approximately perpendicular to said first portion and which has a guide opening therethrough.

12. A device as recited in claim 11, wherein said base member has at another end of said main portion remote from said side portion a portion which is bent to extend approximately perpendicular to said main portion and which has therethrough an opening which serves as a bearing portion.

13. A device as recited in claim 9, wherein said main portion of said plate has on one side thereof a surface, and wherein said bearing member has a first portion disposed against said surface on said plate and has at each end of said first portion a pair of folded portions which are bent to extend parallel to each other and perpendicular to said first portion, each of said folded portions having therethrough an opening which serves as a bearing portion.

14. A device as recited in claim 8, wherein said means supporting an optical element includes a supporting frame fixedly secured to said plate, said supporting frame having thereon a surface which is disposed against said plate and having a recess opening thereinto from said surface, said optical element being supported on said supporting frame within said recess.

15. An optical pick-up device, comprising: a base member having a first fastening structure at a first location thereon and a second fastening structure at a second location thereon spaced from said first location; means supporting an optical element on said base member; a bearing member disposed at one of said first and second locations and having means for facilitating a movable support of said bearing member; and fastening means for fastening said bearing member to said base member at said one of said locations, said fastening means including one of said first fastening structure and said second fastening structure; and further comprising a shaft secured at one end to said base member and projecting outwardly from said base member, a support member supported for rotational movement and axial movement on said shaft and having a optical lens supported thereon, and means for selectively controlling the position of said support member relative to said base member.

16. An optical pick-up device, comprising: a base plate and means for facilitating a movable support of said base plate; a first supporting part fixedly secured to said base plate, said first supporting part having a surface thereon which is disposed against said base plate and having a recess opening thereinto from said surface; an optical element supported on said first supporting part within said recess; a second supporting part and means supporting said second supporting part on said base plate for movement relative to said base plate; a lens provided on said second supporting part; and means for selectively controlling the position of said second supporting part relative to said base plate.

17. A device as recited in claim 16, wherein said recess in said first supporting part includes a central portion and first, second and third grooves which communicate with and extend outwardly from said central portion.

18. A device as recited in claim 17, wherein said second and third grooves extend outwardly from said central portion in approximately opposite directions and said first groove extends approximately perpendicular to said second and third grooves, wherein said first groove has therein at a location spaced from said central portion a light generating device which emits light in a direction toward said central portion and has at a location between said light generating device and said central portion a diffraction grating, wherein said central portion has therein said optical element which is a beam splitter directing light from said light generating device into said second groove, wherein said second groove has therein at a location spaced from said central portion reflecting means for directing light from said beam splitter toward said lens, and wherein said third groove has at a location spaced from said central portion a light receiving element.

19. A device as recited in claim 18, including a further lens supported in said third groove at a location between said light receiving element and said central portion.

* * * * *

UNITED STATES PATENT AND TRADEMARK OFFICE
CERTIFICATE OF CORRECTION

PATENT NO. : 4,962,999
DATED : October 16, 1990
INVENTOR(S) : Ikuo KASUGA

It is certified that error appears in the above-indentified patent and that said Letters Patent is hereby corrected as shown below:

On the title page, item [30] please change the Foreign Priority Data to read as follows:

"65-141437" to ---62-141437[U]---.
"65-141438" to ---62-141438[U]---.
"65-141439" to ---62-141439[U]---.

Signed and Sealed this

Twenty-first Day of March, 1995

Attest:

BRUCE LEHMAN

Attesting Officer

Commissioner of Patents and Trademarks